United States Patent
Chang et al.

(10) Patent No.: US 9,606,685 B2
(45) Date of Patent: Mar. 28, 2017

(54) TOUCH SENSING DEVICE AND 2D SENSING INFORMATION UPDATE METHOD USED IN SAME

(71) Applicant: eGalax_eMPIA Technology Inc., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 62 days.

(21) Appl. No.: 14/580,945

(22) Filed: Dec. 23, 2014

(65) Prior Publication Data

US 2015/0185921 A1  Jul. 2, 2015

(30) Foreign Application Priority Data

Dec. 27, 2013  (TW) .............................. 102148792 A

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ........ G06F 3/044; G06F 3/041; H03K 17/962
USPC .................................. 345/173, 174; 327/517
See application file for complete search history.

(56) References Cited

U.S. PATENT DOCUMENTS

| | | | | |
|---|---|---|---|---|
| 2012/0081332 A1* | 4/2012 | Atsuta | ..................... | G06F 3/044 345/174 |
| 2013/0093500 A1* | 4/2013 | Bruwer | ................ | H03K 17/955 327/517 |
| 2013/0106774 A1* | 5/2013 | Radivojevic | ............ | G06F 3/044 345/174 |
| 2014/0049494 A1* | 2/2014 | Niu | ........................ | G06F 3/0488 345/173 |
| 2014/0267139 A1* | 9/2014 | Slaby | ...................... | G06F 3/044 345/174 |
| 2015/0002441 A1* | 1/2015 | Brunet | .................. | G06F 3/0416 345/174 |

* cited by examiner

*Primary Examiner* — Carolyn R Edwards
*Assistant Examiner* — Yuk Chow
(74) *Attorney, Agent, or Firm* — Muncy, Geissler, Olds & Lowe, P.C.

(57) ABSTRACT

A touch sensing device and 2D sensing information update method used therein is disclosed. Before updating the 2D sensing information for use as a reference 2D sensing information, the processor determines the touch sensing panel is under an abnormal condition if any flatness index is smaller than a predetermined flatness index negative reference value or larger than a predetermined flatness index positive reference value, and will then keep measuring the capacitive coupling amount at each sensing point and getting respective flatness indexes, and will then update the 2D sensing information for use as a reference 2D sensing information when all the flatness indexes are in the range between the predetermined flatness index negative reference value and the predetermined flatness index positive reference value.

6 Claims, 6 Drawing Sheets

TOUCH SENSING DEVICE AND 2D SENSING INFORMATION UPDATE METHOD USED IN SAME

This application claims the priority benefit of Taiwan patent application number 102148792, filed on Dec. 27, 2013.

BACKGROUND OF THE INVENTION

1. Field of the Invention

The present invention relates to touch sensing technology and more particularly, to a touch sensing device 2D sensing information update method that stops from updating the 2D sensing information if the measured flatness index is larger than a predetermined positive flatness reference value or smaller than a predetermined negative flatness reference value that indicates the touch sensing panel of the touch sensing device is in an abnormal status, such as being covered by an external object for a long period of time.

2. Description of the Related Art

In order to comply with human intuition, touch sensing devices are widely used in modern electronic products, enabling the user to control electronic products conveniently by means of a touch of a finger or stylus.

Referring to FIG. 6, when a conventional touch sensing device A1 is started up, the driving and sensing circuit A12 of the touch sensing device A1 measures the capacitive coupling amount C (such as the capacitance value, current value, voltage value or amount of electrical charge) at each of all the sensing points A113 between the driving lines A111 and sensing lines A112 of the touch sensing panel A11 at the time no external objects (finger or stylus) touch the touch sensing panel A11, and then integrates the measured capacitive coupling amount C at each sensing point A113 and the coordinate data of the respective sensing point A113 into a respective 2D sensing information $C_a$, enabling the processor A13 of the touch sensing device A1 to update this 2D sensing information $C_a$ to become a reference 2D sensing information $C_a^0$ and then to store this reference 2D sensing information $C_a^0$ in the memory A14 of the touch sensing device A1.

When an external conductive object touches or covers the touch sensing panel All of the touch sensing device A1, the capacitive coupling amount C at each sensing point A113 within the touched or covered area is relatively changed. Thus, the processor A13 can read in the reference 2D sensing information $C_a^0$ from the memory A14, and then subtracts the reference 2D sensing information $C_a^0$ from each measured capacitive coupling amount C to check the variation of the capacitive coupling amount at each sensing point A113 and to further determine the touch sensing status at each sensing point A113 of the touch sensing panel A11 subject to the variation of the capacitive coupling amount at sensing point.

However, if the capacitive coupling amounts C at some sensing points A113 of the touch sensing panel A11 of the touch sensing device A1 are changed just because the touch sensing panel A11 is accidentally covered by an external object (water drop or user's finger) for a long period of time, the processor A13 can use the 2D sensing information $C_a$ obtained under an abnormal condition as a reference 2D sensing information $C_a^0$ for further determining, leading to a false touch sensing condition determination.

Thus, how to prevent the processor A13 from using a 2D sensing information $C_a$ obtained under an abnormal condition as a reference 2D sensing information $C_a^0$ for determining a touch is an important subject to study in touch-screen technology.

SUMMARY OF THE INVENTION

The present invention has been accomplished under the circumstances in view. It is therefore the main object of the present invention to provide a touch sensing device 2D sensing information update method that effectively prevents the processor of the touch sensing device from using a 2D sensing information obtained under an abnormal condition as a reference 2D sensing information for matching.

To achieve this and other objects of the present invention, a touch sensing device 2D sensing information update method, which enables the processor of the touch sensing device to process the 2D sensing information for creating multiple local 2D sensing information, and then to compute from all the created local 2D sensing information to get respective flatness indexes, and then to integrate the respective flatness indexes and the respective coordinate data of the local 2D sensing information for creating a flatness index information, and then enables the processor to compare each flatness index of the flatness index information with a predetermined flatness index negative reference value and a predetermined flatness index positive reference value. If any flatness index of the flatness index information is smaller than the predetermined flatness index negative reference value or larger than the predetermined flatness index positive reference value, it means the touch sensing panel is under an abnormal condition (such as being accidentally covered by an external object). At this time, the touch sensing device 2D sensing information update method enables the processor to repeatedly get the 2D sensing information in the follow-up time period for repeatedly computing the respective flatness index information, and then enables the processor to repeatedly compute the respective flatness index information until that all flatness indexes are in the range between the predetermined flatness index negative reference value and the predetermined flatness index positive reference value. Thus, the method enables the touch sensing device to accurately determine any touch sensing status for accurate touch sensing control.

DETAILED DESCRIPTION OF THE PREFERRED EMBODIMENT

Figure 1:
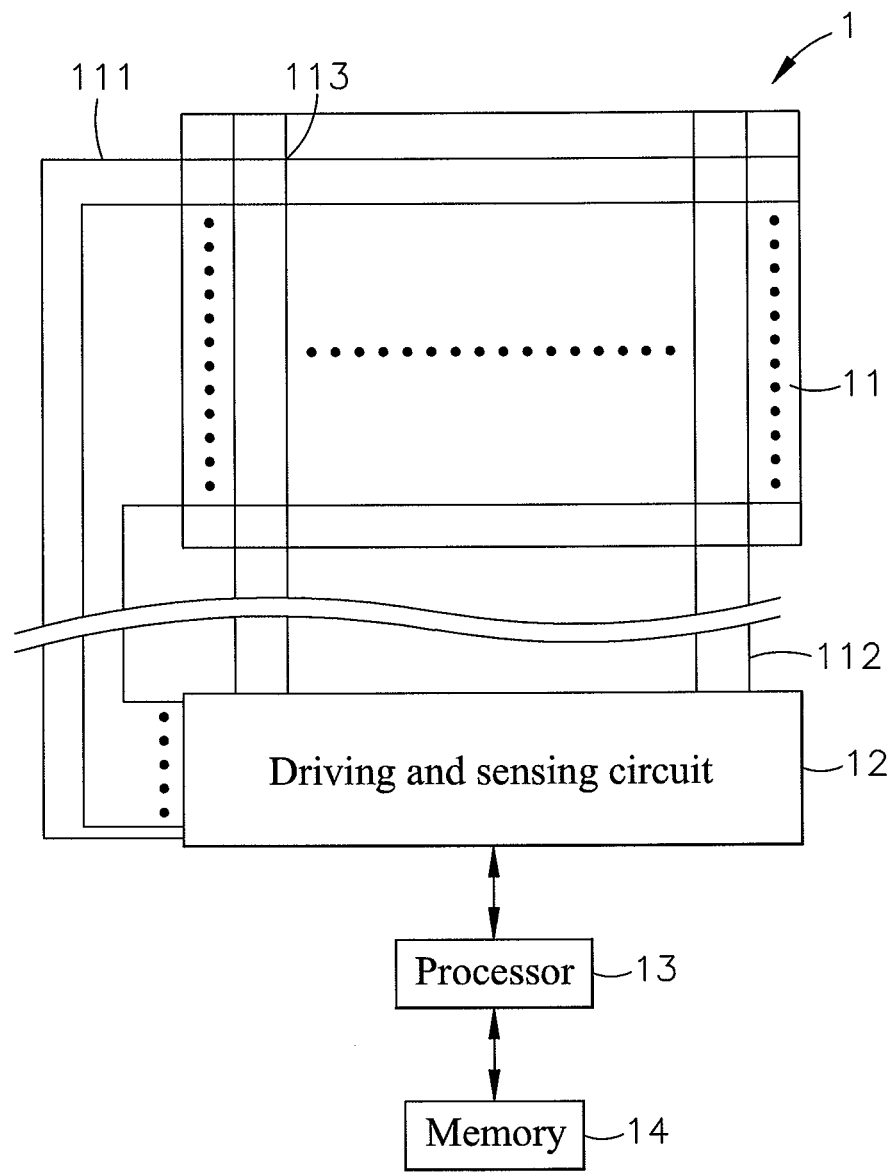
FIG. 1 is a schematic circuit block diagram of a touch sensing device in accordance with the present invention.

Referring to FIG. 1, a touch sensing device 2D sensing information update method in accordance with the present invention is used in a mutual capacitance touch sensing device 1. The mutual capacitance touch sensing device 1 includes a touch sensing panel 11 having arranged therein a plurality of driving lines 111 extending along a first axis in a parallel manner and a plurality of sensing lines 112 extending along a second axis in a parallel manner and crossed over the driving lines 111 in an orthogonal crossover configuration (or non-orthogonal crossover configuration) to form a plurality of sensing points, i.e., sensing points 113, a driving and sensing circuit 12 electrically connected with the driving lines 111 and sensing lines 112 of the touch sensing panel 11, a processor 13 electrically connected with the driving and sensing circuit 12, and a memory 14 electrically connected to the processor 13.

Figure 2:
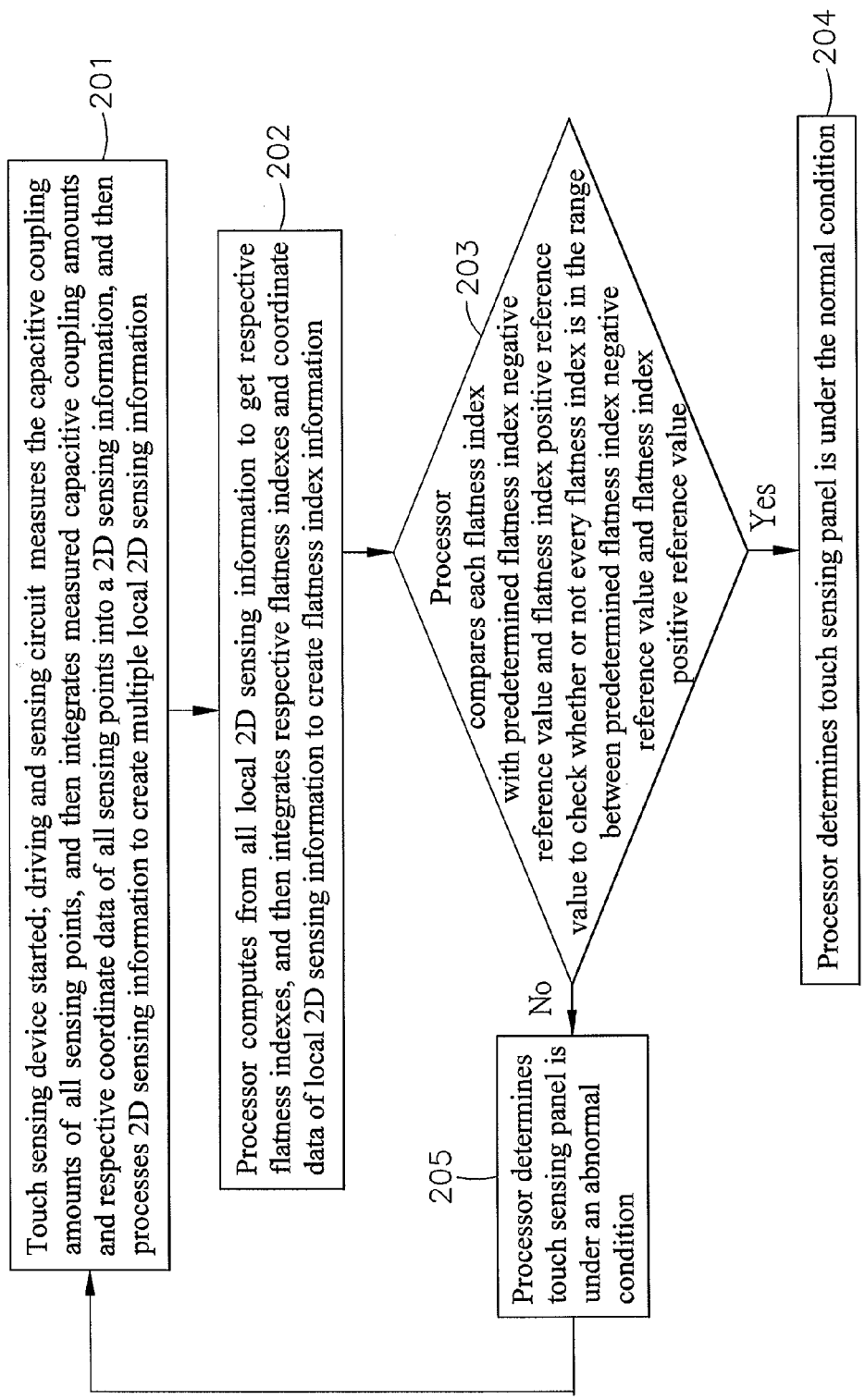
FIG. 2 is a flow chart of a touch sensing device 2D sensing information update method in accordance with the present invention.

Referring to FIG. 2, the touch sensing device 2D sensing information update method includes the steps of:

(201) The driving and sensing circuit 12 measures the capacitive coupling amount C of each of all the sensing points 113 of the touch sensing panel 11, and then integrates the measured capacitive coupling amount C of each of all the sensing points 113 and the respective coordinate data of the all sensing points 113 into a 2D sensing information $C_a$, and then processes the 2D sensing information $C_a$ to create multiple local 2D sensing information $C_p$ by integrating each predetermined number of adjacent sensing points 113 of all the sensing points 113 and their respective capacitive coupling amounts C.

(202) The processor 13 computes from all the created local 2D sensing information $C_p$ to get respective flatness indexes S, and then integrates the respective flatness indexes S and the respective coordinate data of the local 2D sensing information $C_p$ to create a flatness index information $S_a$.

(203) The processor 13 compares each flatness index S of the flatness index information $S_a$ with a predetermined flatness index negative reference value $Z_{min}$ and a predetermined flatness index positive reference value $Z_{max}$ to check whether or not every flatness index S is in the range between the predetermined flatness index negative reference value $Z_{min}$ and the predetermined flatness index positive reference value $Z_{max}$. And then proceed to step (204) if positive, or step (205) if negative.

(204) The processor 13 determines that the touch sensing panel 11 is under the normal condition, and then updates the 2D sensing information $C_a$ for use as a reference 2D sensing information $C_a^0$.

(205) The processor 13 determines that the touch sensing panel 11 is under an abnormal condition.

In the aforesaid steps when the touch sensing panel 11 is started, the driving and sensing circuit 12 provides a driving signal to every driving line 111 of the touch sensing panel 11. At this time, each driving line 111 is capacitively coupled with the respective sensing line 112 to generate a respective capacitive coupling amount C at the associating sensing point 113 of the touch sensing panel 11. The driving and sensing circuit 12 can get the capacitive coupling amount C at each sensing point 113 by measuring the physical quantity of the capacitance value, current value, voltage value or electrical charge amount at the respective sensing point 113. Thereafter, the driving and sensing circuit 12 integrates the measured capacitive coupling amount C of each of all the sensing points 113 and the coordinate data of each of all the sensing points 113 into a 2D sensing information $C_a$. Thereafter, the processor 13 processes the 2D sensing information $C_a$ to create a flatness index information $S_a$. Before updating the 2D sensing information $C_a$ for use as a reference 2D sensing information $C_a^0$, the processor 13 uses the flatness index information $S_a$ to check any abnormality in the touch sensing panel 11.

Figure 3:
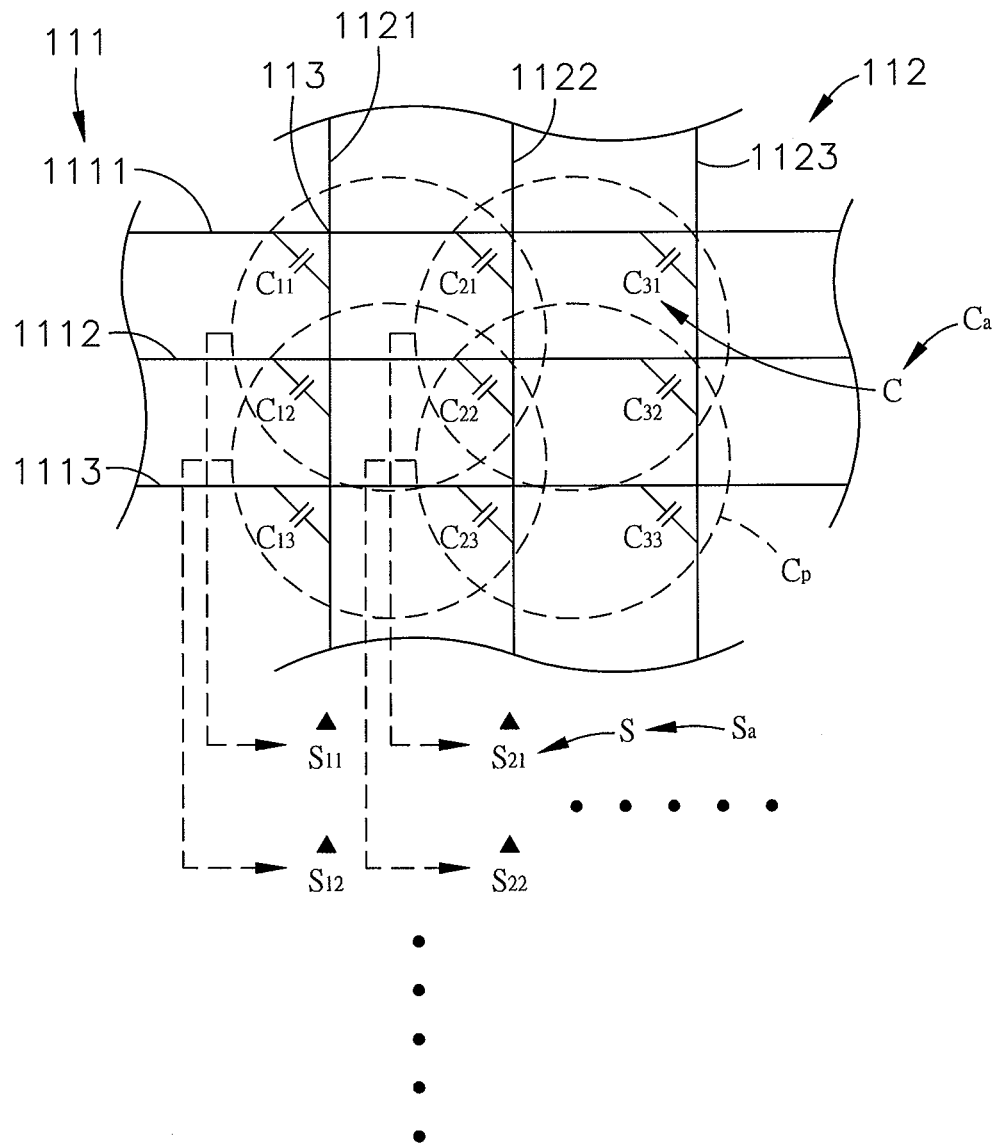
FIG. 3 is a schematic drawing illustrating the creation of the flatness index information in accordance with the present invention.

Referring to FIG. 3, the processor 13 processes the 2D sensing information $C_a$ to create multiple local 2D sensing information $C_p$ by integrating each predetermined number of adjacent sensing points 113 of all the sensing points 113 between a predetermined number of adjacent driving lines 111 and respective adjacent sensing lines 112 and the respective capacitive coupling amounts C of the predetermined number of adjacent sensing points 113. Thereafter, the processor 13 computes from all the created local 2D sensing information $C_p$ to get respective flatness indexes S, and then integrates the respective flatness indexes S and the respective coordinate data of the local 2D sensing information $C_p$ to create a flatness index information $S_a$. Further, the processor 13 computes from each local 2D sensing information $C_p$ to get a respective flatness index S by: subtracting the multiple capacitive coupling amounts at each driving line 111 from one another in the order along the first axis to get respective reminders, and then subtracting the reminders from one another in the order along the second axis. Because the capacitive coupling amounts C at all the sensing points 113 are approximately equal under normal conditions, the flatness index S obtained by subtracting the capacitive coupling amounts C is approximately equal to zero, i.e., the flatness index S will be in the range between the predetermined flatness index negative reference value $Z_{min}$ and the predetermined flatness index positive reference value $Z_{max}$. The predetermined flatness index negative reference value $Z_{min}$ and the predetermined flatness index positive reference value $Z_{max}$ are built in the processor 13 for enabling the processor 13 to compare each flatness index S in the flatness index information $S_a$ with the predetermined flatness index negative reference value $Z_{min}$ and the predetermined flatness index positive reference value $Z_{max}$ and to further check any abnormality in the touch sensing panel 11. With respect to the computation and variation of the flatness index S, please refer to the present inventor's another patent application entitled "Mutual capacitance touch sensing device and method for inspecting same", filed on the same date.

Figure 4:
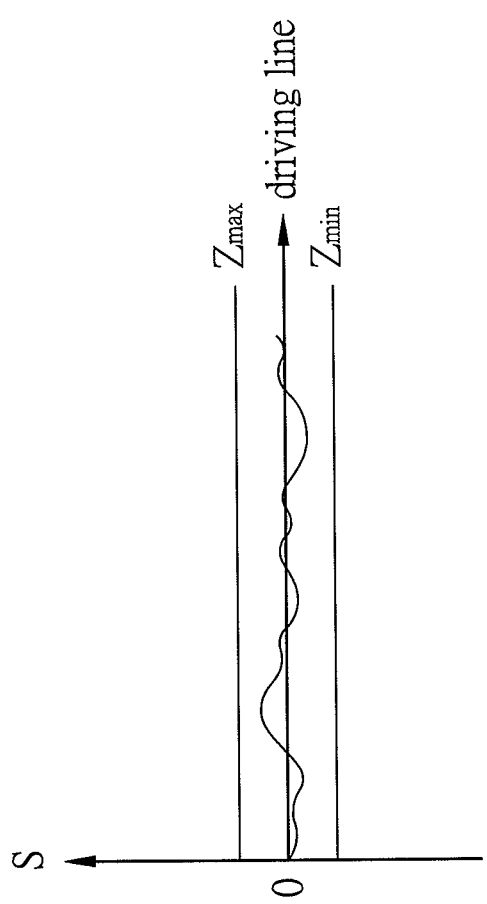
FIG. 4 is a flatness index curve obtained from a qualified (up-to-grade) touch sensing panel in accordance with the present invention.
Figure 5:
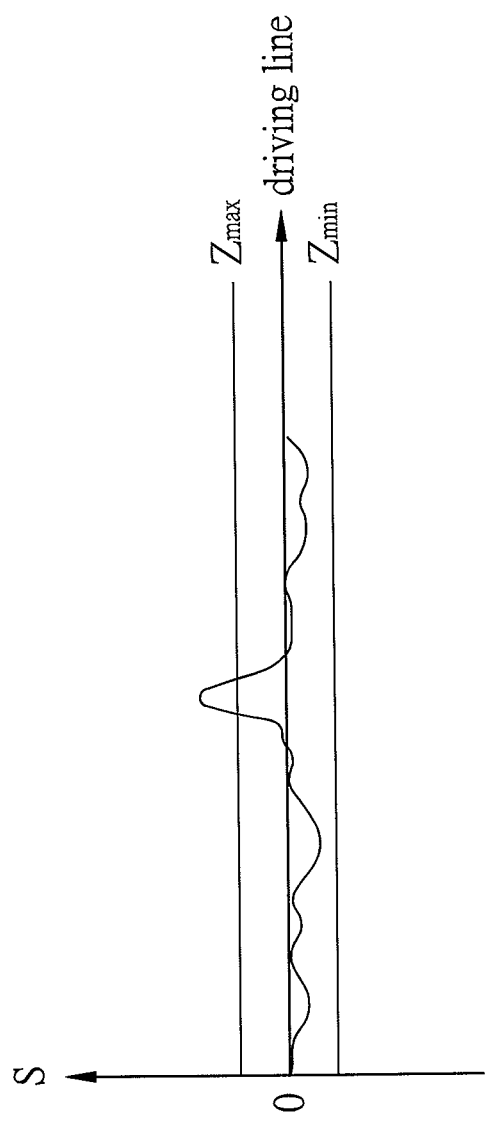
FIG. 5 is a flatness index curve obtained from a detective touch sensing panel in accordance with the present invention.
Figure 6:
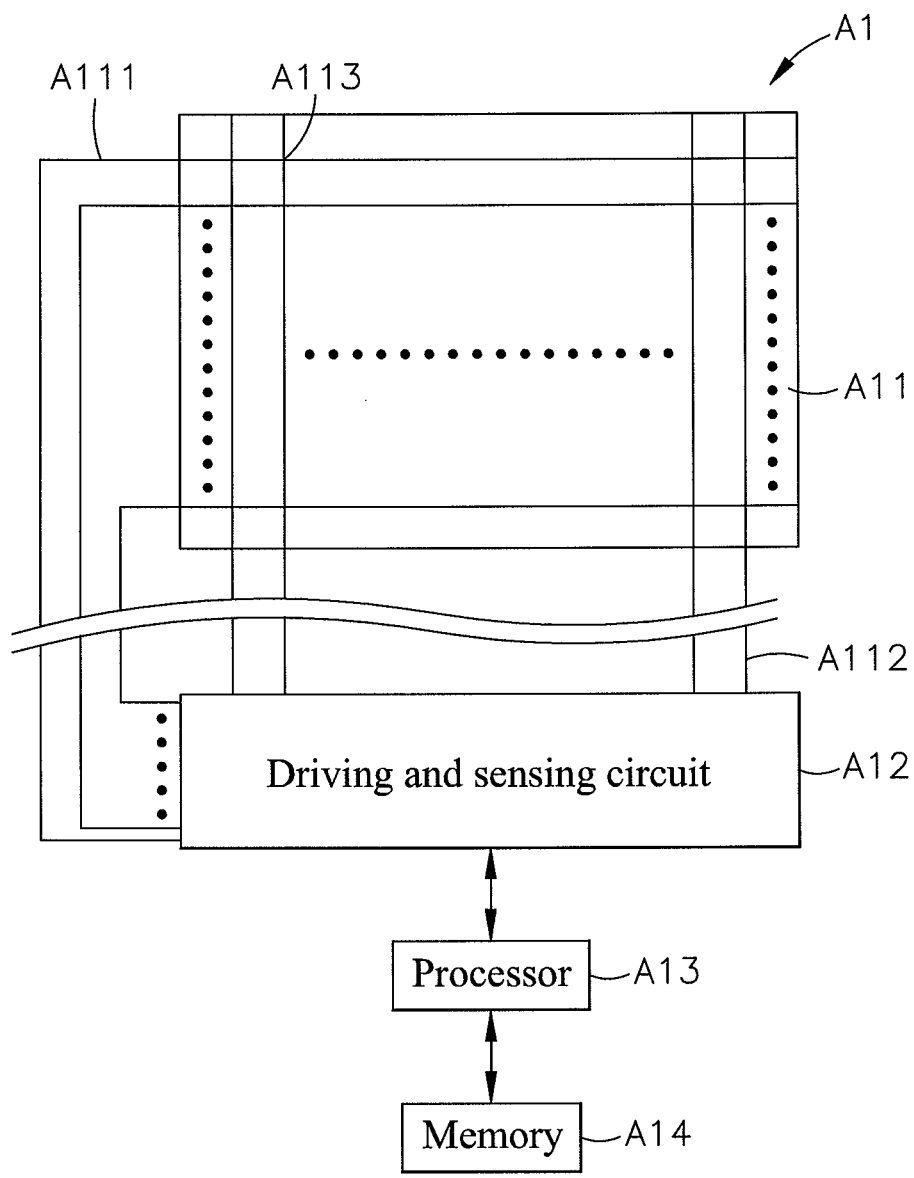
FIG. 6 is a schematic circuit block diagram of a conventional touch sensing device.

Referring to FIGS. 4 and 5, flatness index curves respectively obtained from a qualified (up-to-grade) touch sensing panel and a detective touch sensing panel in accordance with the present invention are shown. In FIGS. 4 and 5, the horizontal axis indicates the arrangement of all the sensing points 113 on the driving line 111; the vertical axis indicates the flatness indexes S of the respective sensing points 113. Before updating the 2D sensing information $C_a$ for use as a reference 2D sensing information $C_a^0$, the processor 13 uses the flatness index information $S_a$ to check any abnormality in the touch sensing panel 11 by comparing each flatness index S of the flatness index information $S_a$ with the predetermined flatness index negative reference value $Z_{min}$ and the predetermined flatness index positive reference value $Z_{max}$. If every flatness index S is in the range between the predetermined flatness index negative reference value $Z_{min}$ and the predetermined flatness index positive reference value $Z_{max}$ (see FIG. 4), the processor 13 determines that the touch sensing panel 11 is under the normal condition, i.e., there is no external objects (finger, stylus or water drop) touch or cover the touch sensing panel 11, and then updates the 2D sensing information $C_a$ for use as a reference 2D sensing information $C_a^0$ for comparison with follow-up 2D sensing information $C_a$ measured. If any flatness index S is smaller than the predetermined flatness index negative reference value $Z_{min}$ or larger than the predetermined flatness index positive reference value $Z_{max}$ (see FIG. 5), the processor 13 determines that the multiple sensing points 113 in the touch sensing panel 11 within the area of the local 2D sensing information $C_p$ of the respective flatness index S are covered by external object (finger, stylus or water drop) for a long period of time. At this time, the processor 13 repeatedly gets the 2D sensing information $C_a$ in the follow-up time period for repeatedly computing the respective flatness index information $S_a$, and then repeatedly computes the respective flatness index information $S_a$ until that all flatness indexes S are in the range between the predetermined flatness index negative reference value $Z_{min}$ and the predetermined flatness index positive reference value $Z_{max}$. After all flatness indexes S are in the range between the predetermined flatness index negative reference value $Z_{min}$ and the predetermined flatness index positive reference value $Z_{max}$, the processor 13 updates the 2D sensing information $C_a$ for use as a reference 2D sensing information $C_a^0$ for comparison with follow-up 2D sensing information $C_a$ measured.

As stated above, the processor 13 processes the 2D sensing information $C_a$ to create multiple local 2D sensing information $C_p$ and then to compute from all the created local 2D sensing information $C_p$ to get respective flatness indexes S, and then integrates the respective flatness indexes S and the respective coordinate data of the local 2D sensing information $C_p$ to create a flatness index information $S_a$. Thereafter, the processor 13 compares each flatness index S of the flatness index information $S_a$ with the predetermined flatness index negative reference value $Z_{min}$ and the predetermined flatness index positive reference value $Z_{max}$. If any flatness index S of the flatness index information $S_a$ is smaller than the predetermined flatness index negative reference value $Z_{min}$ or larger than the predetermined flatness index positive reference value $Z_{max}$, it means the presence of an abnormal condition that the sensing points 113 in the area of the local 2D sensing information $C_p$ corresponding to this flatness index S are accidentally covered by a water drop or user's finger for a long period of time. At this time, the processor 13 will repeatedly get the 2D sensing information $C_a$ in the follow-up time period for repeatedly computing the respective flatness index information $S_a$, and will then repeatedly compute the respective flatness index information $S_a$ until that all flatness indexes S are in the range between the predetermined flatness index negative reference value $Z_{min}$ and the predetermined flatness index positive reference value $Z_{max}$. After all flatness indexes S are in the range between the predetermined flatness index negative reference value $Z_{min}$ and the predetermined flatness index positive reference value $Z_{max}$, the processor 13 can then update the 2D sensing information $C_a$ for use as a reference 2D sensing information $C_a^0$ for further matching.

Further, the processor 13 can store the reference 2D sensing information $C_a^0$ in the memory 14, and read in the storage reference 2D sensing information $C_a^0$ from the memory 14 for matching with the follow-up measured 2D sensing information $C_a$ for determining the touch sensing status of each sensing point 113 of the touch sensing panel 11.

In conclusion, the invention provides a touch sensing device 2D sensing information update method for use in a touch sensing device. The method enables the processor 13 of the touch sensing device 1 to process the 2D sensing information $C_a$ that is obtained by integrating the measured capacitive coupling amount C at each of all the sensing points 113 and the coordinate data of each of all the sensing points 113, and to compute from local 2D sensing information $C_p$ of the 2D sensing information $C_a$ so as to further get respective flatness indexes S, and then enables the processor 13 to integrate the respective flatness indexes S and the respective coordinate data of the local 2D sensing information $C_p$ to create a flatness index information $S_a$, and then enables the processor 13 to compare each flatness index S of the flatness index information $S_a$ with a predetermined flatness index negative reference value $Z_{min}$ and a predetermined flatness index positive reference value $Z_{max}$. If any flatness index S of the flatness index information $S_a$ is smaller than the predetermined flatness index negative reference value $Z_{min}$ or larger than the predetermined flatness index positive reference value $Z_{max}$, it means the presence of an abnormal condition that the sensing points 113 in the area of the local 2D sensing information $C_p$ corresponding to this flatness index S are accidentally covered by a water drop or user's finger for a long period of time. At this time, the processor 13 will repeatedly get the 2D sensing information $C_a$ in the follow-up time period for repeatedly computing the respective flatness index information $S_a$, and will then repeatedly compute the respective flatness index information $S_a$ until that all flatness indexes S are in the range between the predetermined flatness index negative reference value $Z_{min}$ and the predetermined flatness index positive reference value $Z_{max}$. After all flatness indexes S are in the range between the predetermined flatness index negative reference value $Z_{min}$ and the predetermined flatness index positive reference value $Z_{max}$, the processor 13 can then update the 2D sensing information $C_a$ for use as a reference 2D sensing information $C_a^0$ for further matching.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A touch sensing device 2D sensing information update method used in a touch sensing device comprising a touch sensing panel having arranged therein a plurality of driving lines extending along a first axis in a parallel manner and a plurality of sensing lines extending along a second axis in a parallel manner and crossed over the driving lines to form a plurality of sensing points, a driving and sensing circuit electrically connected with the driving lines and the sensing lines and adapted for measuring a capacitive coupling amount at each the sensing point, a processor electrically connected with the driving and sensing circuit, and a memory electrically connected to the processor, the touch sensing device 2D sensing information update method comprising the steps of:

(A01) the driving and sensing circuit measuring the capacitive coupling amount of each of all the sensing points, and then integrating each measured capacitive coupling amount and the respective coordinate data of all the sensing points into a 2D sensing information, and then processing the 2D sensing information to create multiple local 2D sensing information by integrating each predetermined number of adjacent the sensing points of all the sensing points and the respective capacitive coupling amounts;

(A02) the processor computing from all the created the local 2D sensing information to get respective flatness indexes, and then integrating the flatness indexes and the respective coordinate data of the local 2D sensing information to create a flatness index information;

(A03) the processor comparing each the flatness index of the flatness index information with a predetermined flatness index negative reference value and a predetermined flatness index positive reference value to check whether or not every flatness index is in the range between the predetermined flatness index negative reference value and the predetermined flatness index positive reference value, and then proceeding to step (204) if positive, or step (205) if negative;

(A04) the processor determining that the touch sensing panel is under the normal condition, and then updating the 2D sensing information for use as a reference 2D sensing information;

(A05) the processor determining that the touch sensing panel is under an abnormal condition, and then returning to step (A01).

2. A touch sensing device 2D sensing information update method used in a mutual capacitance touch sensing device comprising a touch sensing panel having arranged therein a plurality of driving lines extending along a first axis in a parallel manner and a plurality of sensing lines extending along a second axis in a parallel manner and crossed over the driving lines to form a plurality of sensing points, a driving and sensing circuit electrically connected with the driving lines and the sensing lines and adapted for measuring a capacitive coupling amount at each the sensing point, a processor electrically connected with the driving and sensing circuit, and a memory electrically connected to the processor, the touch sensing device 2D sensing information update method comprising the steps of:

(i) enabling the processor to control the driving and sensing circuit in measuring the capacitive coupling amount of each of all the sensing points, and then to integrate each measured capacitive coupling amount and the respective coordinate data of all the sensing points into a 2D sensing information;

(ii) enabling the processor to compute from the capacitive coupling amounts of the sensing points between at least two adjacent driving lines and at least two adjacent sensing lines to get respective flatness indexes, and then enabling the processor to compare each the flatness index with a predetermined flatness index negative reference value and a predetermined flatness index positive reference value so as to check every the flatness index to be in the range between the predetermined flatness index negative reference value and the predetermined flatness index positive reference value, or small then the predetermined flatness index negative reference value, or larger than the predetermined flatness index positive reference value; and (iii) returning to step (i) if one of the flatness index is smaller than the predetermined flatness index negative reference value or larger than the predetermined flatness index positive reference value, and repeating step (i) until that all the flatness indexes are in the range between the predetermined flatness index negative reference value and the predetermined flatness index positive reference value.

3. The touch sensing device 2D sensing information update method as claimed in claim 2, further comprising a sub step of enabling the processor to store the 2D sensing information in the memory for use as a reference 2D sensing information if all the flatness indexes are in the range between the predetermined flatness index negative reference value and the predetermined flatness index positive reference value.

4. A touch sensing device comprising:
a touch sensing panel comprising a plurality of driving lines extending along a first axis in a parallel manner, and a plurality of sensing lines extending along a second axis in a parallel manner and crossed over the driving lines to form a plurality of sensing points;

a driving and sensing circuit electrically connected with the driving lines and the sensing line and adapted for measuring the capacitive coupling amount of each of all the sensing points and then integrating the measured capacitive coupling amounts of all the sensing points and the respective coordinate data of the sensing points into a 2D sensing information; and a processor electrically connected with the driving and sensing circuit for computing the 2D sensing information to get a flatness index information and determining whether or not each the flatness index of the flatness index information is in the range between a predetermined flatness index negative reference value and a predetermined flatness index positive reference value.

5. A touch sensing device, comprising:
a plurality of driving lines and a plurality of sensing lines respectively crossed over the driving lines to form a plurality of sensing points;

a driving and sensing circuit electrically connected with the driving lines and the sensing line; and a processor electrically connected with the driving and sensing circuit and adapted for controlling driving and sensing circuit to measure the capacitive coupling amount at each of all the sensing points, and then integrating each measured capacitive coupling amount and the respective coordinate data of all the sensing points into a 2D sensing information, and then processing the 2D sensing information to create multiple local 2D sensing information by integrating each predetermined number of adjacent the sensing points of all the sensing points and the respective capacitive coupling amounts, and then computing from the capacitive coupling amounts of the sensing points between at least two adjacent driving lines and at least two adjacent sensing lines to get respective flatness indexes, and then comparing each the flatness index with a predetermined flatness index negative reference value and a predetermined flatness index positive reference value so as to check every the flatness index to be in the range between the predetermined flatness index negative reference value and the predetermined flatness index positive reference value, or small than the predetermined flatness index negative reference value, or larger than the predetermined flatness index positive reference value, and then repeating the procedure of measuring the capacitive coupling amount of each of all the sensing points and getting respective flatness indexes if one the flatness index is smaller the predetermined flatness index negative reference value or larger than the predetermined flatness index positive reference value, and repeating the procedure of measuring the capacitive coupling amount of each of all the sensing points and getting respective flatness indexes until that all the flatness indexes are in the range between the predetermined flatness index negative reference value and the predetermined flatness index positive reference value.

6. The touch sensing device as claimed in claim 5, further comprising a memory electrically connected to the processor and adapted for storing the flatness index information.

* * * * *